United States Patent Office 3,146,386
Patented Aug. 25, 1964

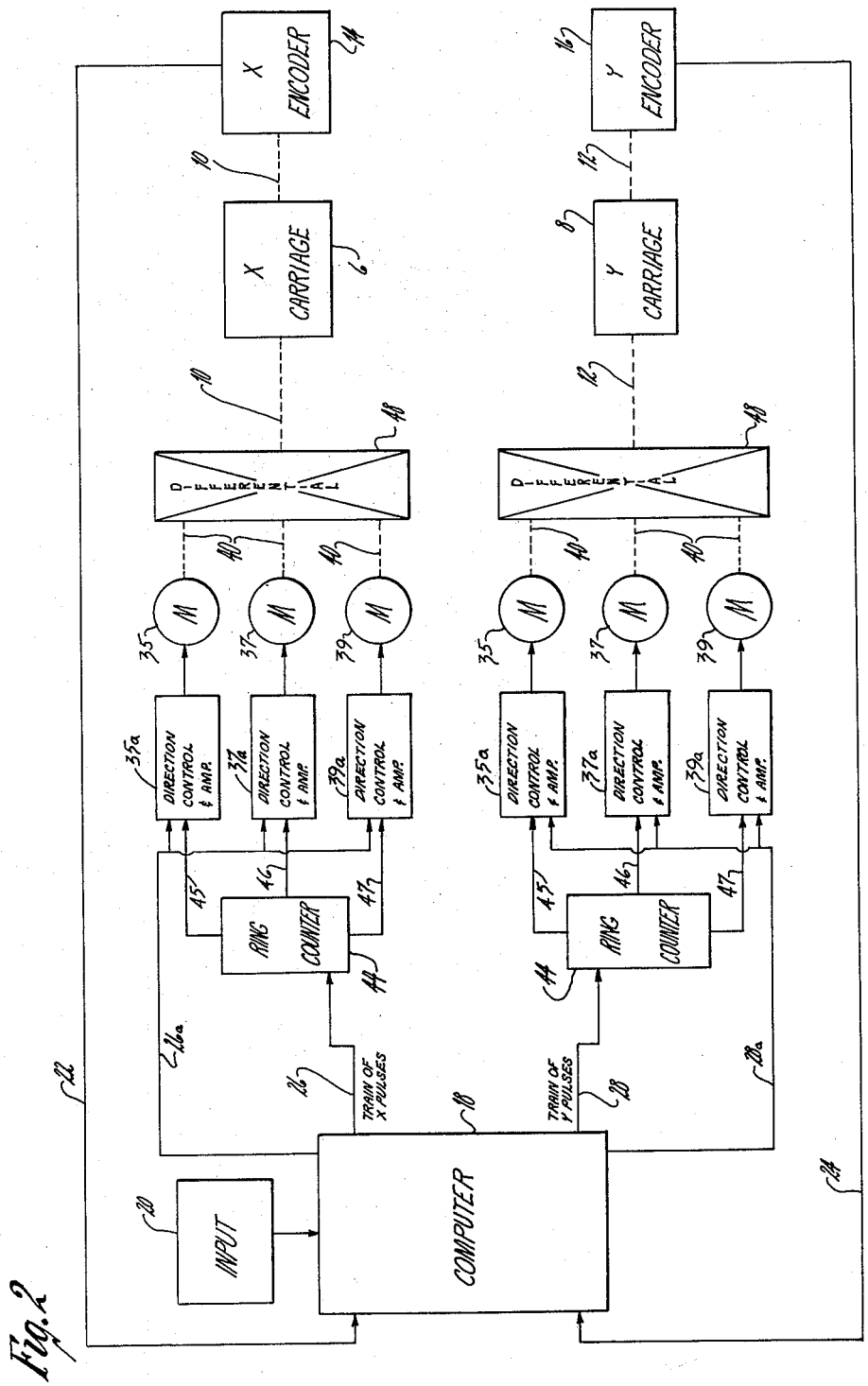

3,146,386
STEPPING MOTOR DRIVE
Heinz Joseph Gerber, West Hartford, Conn., assignor to
The Gerber Scientific Instrument Company, Hartford,
Conn., a corporation of Connecticut
Filed July 10, 1963, Ser. No. 293,944
11 Claims. (Cl. 318—8)

This invention relates to devices, such as, for example, X–Y plotters, wherein a part is moved relative to another part and in a given coordinate direction in response to a train of electrical pulses each of which represents a definite displacement of the part, and deals more particularly with an improved stepping motor drive for such a device.

Although the stepping motor drive of the present invention may be applied to many different devices employing pulse driven positioning means, it is for convenience herein referred to as applied to an X–Y plotter. The general type of plotter referred to is shown in the copending application of Gerber and Logan, Serial No. 228,289, filed October 4, 1962, and entitled "X–Y Plotter." The plotter disclosed in this latter application includes a drive mechanism which adapts the plotter primarily for use in the plotting of spaced points, whereas the drive mechanism of the present application is adapted for use in a path control or line drawing plotter as well as for use in point plotters. Nevertheless, except for the differences in the drive mechanism the plotter referred to herein may be substantially identical with that shown in the copending application, particularly with regard to the means for supporting and moving the X and Y carriages relative to the plotting surface, and reference is made to said application for an understanding of said latter means.

In the past it has been known to use a stepping motor in a plotter or other device for driving the screw shaft or other means which acts to move a part in one coordinate direction relative to a plotting surface, workpiece or other part. Such stepping motors are of the type which are responsive to applied pulses of electrical power and function to rotate their output shafts a discrete and precise amount for each pulse received. These motors are particularly of advantage in X–Y plotters, for example, insofar as one motor connected to the screw shaft or other drive means for either carriage can be operated to move the carriage a very accurately determined distance by simply applying a definite number of input pulses thereto. A major drawback, however, it that the motors have a relatively slow output speed, they being capable of accepting input pulses only at relatively low rates without the output torque falling below an acceptable value. That is, as the speed of the motor is increased by increasing the rate of applied pulses, the torque decreases and eventually falls, usually at a relatively low pulse rate, below a value necessary for driving the associated carriage with the result that the motor will stall or fail to respond to some of the applied pulses, thereby introducing errors. Consequently the motors in the past have had to be driven at low pulse rates, with attendant low carriage speeds, in order to avoid stalling or skipping of the motors.

The general object of this invention is to provide a stepping motor drive mechanism for an X–Y plotter or other pulse operated devices which mechanism is capable of driving the carriages or other parts of such a device at high speeds and with great positional accuracy relative to the plotting surface or other reference part.

A more particular object of the invention is to provide a pulse operated stepping motor drive, which drive has a much greater output power rating than previous stepping motor drives and is therefore capable of driving the associated parts at much higher speeds than previously possible.

Other objects and advantages of the invention will be apparent from the following description and from the drawing forming a part hereof.

The drawing shows preferred embodiments of the invention and such embodiments will be described, but it will be understood that various changes may be made from the constructions disclosed, and that the drawing and description are not to be construed as limiting the scope of the invention, the claims forming a part of this specification being relied upon for that purpose.

Of the drawing:

FIG. 2 is a schematic illustration in block diagram form of another embodiment of the present invention.

Figure 1:
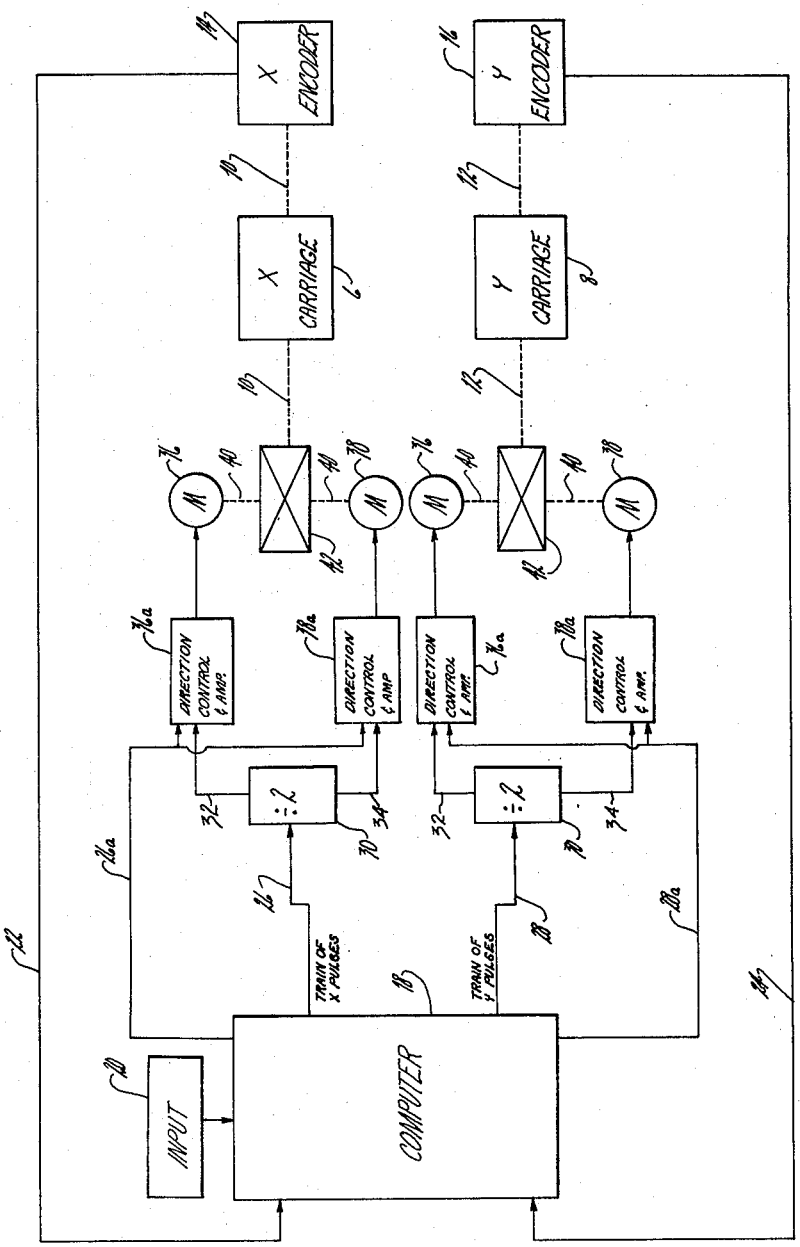
FIG. 1 is a schematic illustration in block diagram form of one embodiment of the present invention.

Referring first to FIG. 1, this figure illustrates in block diagram form a stepping motor drive mechanism of the present invention as applied to an X–Y plotter, the plotter including an X carriage 6 and a Y carriage 8 movable respectively in the X and Y coordinate directions relative to a plotting surface by drive means such as lead screws indicated generally by the broken lines 10 and 12. For example, the X carriage 6 may be similar to the X carriage 38 of the plotter shown and described in my above-referred to copending application, and the Y carriage 8 may be similar to the Y carriage 36 of said copending application. Likewise the lead screws 10 and 12 of FIG. 1 may correspond to the lead screws 136 and 45 of said copending application. It will be understood that fixed to one of the carriages is a part (not shown), such as a printing or pen-carrying head, tool or other device, which is movable to various points on a plotting surface, or to various positions relative to another reference part, by the combined movements of the X and Y carriages in the X and Y coordinate directions. For measuring the position of the X carriage relative to the plotting surface or other reference part, the lead screw 10 is drivingly connected with a shaft encoder 14 which may be similar to the encoder 166 of the above-referred to copending application, and for measuring the position of the Y carriage along the Y axis the lead screw 12 is drivingly connected with an encoder 16 which may be similar to the encoder 142 of the copending application.

The lead screws 10 and 12 are rotatably driven by a control mechanism which includes a computer 18. Associated with the latter computer is an input device 20 which may, for example, comprise a punched tape reader. Other inputs to the computer 18 include the output of the encoders 14 and 16 which are transmitted to the computer through the lines 22 and 24 respectively. The details of the computer form no part of the present invention and various suitable forms of computers will be apparent to those skilled in the art from the following description of its operation.

Assuming the printing head or other movable part to be at one position, the starting point, relative to the reference part, the input device 20 operates to feed into the computer 18 information as to the X and Y coordinates of another point, the end point, to which it is desired to have the movable part moved. The computer accepts this information and compares it with the present position of the X and Y carriages, or starting point, as represented by the information fed into the computer by the encoders 14 and 16 through the lines 22 and 24. The computer operates on the information regarding the X axis and on the information regarding the Y axis and as an output produces two primary trains of electrical pulses which appear on output lines indicated at 26 and 28. As brought out hereinafter, the pulses appearing on the line 26 are used to effect movement of the X carriage and the pulses appearing on the line 28 are used to effect movement of the Y carriage. As will be more evident hereinafter, each pulse appearing on the line 26 causes movement of the associated lead screw 10 by a given angular increment and therefore produces a predetermined exact displacement of the X carriage in the X direction. For example, one pulse appearing on the line 26 may be equivalent to and cause movement of the X carriage 0.003 inch in the X direction. Likewise, each pulse appearing on the line 28 also is equivalent to and causes displacement of the Y carriage by a definite predetermined increment in the Y direction. Also, as trains of pulses appear on the lines 26 and 28, the computer produces sign signals on associated lines 26a and 28a which, as hereinafter described, control the direction (positive or negative) of movement of the movable part in each coordinate direction or axis.

The trains of pulses appearing on the lines 26 and 28 may be related in various different manners to the displacement of the X and Y carriages from the final position or end point dictated by the input device 20. For example, the computer 18 may operate to subtract the X command position supplied by the input device 20 from the present X position as supplied by the X encoder 14 and to then generate a train of pulses on the line 26 containing pulses equal in number to the initial displacement of the X carriage from its final position divided by movement of the X carriage effected by each pulse, no special regard being given to the rate of pulse generation. The same procedure in this case would also be carried out for the Y axis. This type of pulse generation is generally adequate in cases where the plotter is used to plot only the end points dictated by the input device 20, but is unsatisfactory in cases where it is desired to draw a straight line between each starting point and the associated end point. In the case of plotters where it is desired to draw such lines, it is generally preferable that the computer operate to generate the trains of pulses in such a manner that the pulse rate of one train divided by the pulse rate of the other train is equal to the slope of the line to be drawn. If these trains of pulses are then applied to the drives for the X and Y carriages, the latter carriages will be moved in such a manner that the printing head, pen, tool or other part is moved in the desired straight line. Second degree and higher order curves can also be drawn by having the computer modify, in accordance with known techniques, the ratio of the pulse trains as the curve is generated. In either case, the computer 18 may operate to sense the positions of the X and Y carriages only at the beginning of each line drawing operation, but preferably the encoders are interrogated frequently as each line or curve is being drawn and the trains of pulses adjusted to correct for any errors which may be introduced.

The trains of pulses appearing on the lines 26 and 28 operate stepping motors which drive the lead screws 10 and 12. As previously mentioned, any one stepping motor is limited as to the rate at which pulses may be applied thereto and accordingly stepping motors have heretofore been limited to use with relatively slow speed or light weight plotters. According to the present invention, however, each train of primary pulses is divided into a plurality of secondary pulse trains and these pulse trains used to actuate a corresponding plurality of stepping motors. The outputs of these motors are then recombined through a differential gear box to drive the associated lead screw or other drive member. Preferably, the pulse rate of each secondary train is substantially less than the pulse rate of the primary train and therefore each stepping motor may be operated at a slow speed and high torque output while nevertheless achieving a high speed movement of the printing head or other movable part. That is, each stepping motor is operated at a slow pulse or stepping rate at which its output torque is high and adequate for driving the associated parts, but although each motor has a slow speed output, this output is summed through the differential with the other outputs to produce a resultant desired high speed movement of the lead screw or other similar drive member. As used herein and in the claims which follow the term "stepping motor" refers to any pulse responsive stepping motor having an output member which is moved by a given displacement or step in response to each pulse applied thereto. It will of course be understood that in some stepping motors, the electrical pulses are not applied directly to the windings of the motor but instead are applied to a switching logic device or driver which controls the energization of the windings so as to change the state of energization of the windings in response to each pulse. In regard to this latter case, the term "stepping motor" is intended to include the switching logic device or driver associated with the windings, as well as including the windings, stator, rotor and other parts of the motor. Such switching logic devices or drivers are commonly supplied by manufacturers as part of the stepping motor and vary in construction in accordance with variations in the remainder of the motor.

In FIG. 1, the means for dividing each train of primary pulses into the secondary trains of pulses comprises a "divide-by-two" device 30 having two associated output lines 32 and 34. Such a divide-by-two device may, for example, constitute a flip-flop. The operation for both the X and Y axes are identical, and considering the X axis for example, the operation of the divide-by-two device 30 is such that alternate pulses appearing on the line 26 cause pulses to appear on the lines 32 and 34 respectively. That is, the pulses appearing on the line 26 are in effect sequentially transmitted by the divide-by-two device to the lines 32 and 34 so that the pulse rate of the pulses appearing on either line 32 or 34 is half of the pulse rate of the pulses appearing on the line 26. The two output lines 32 and 34 are respectively associated with two stepping motors 36 and 38 each of which has a rotatable output member or shaft 40 connected with a respective input to a differential gear box 42, the output of the latter gear box being drivingly connected with the lead screw 10 as shown. The gear box 42 is so constructed as to produce as its output shaft a rotation equal to the sum of the rotations of the input shafts. The stepping motors 36 and 38 are or may be reversed electrically by controlling the sequence in which the states of energization of their coils are changed by the applied pulses. For example, each motor may be of a type having four coils identified as A, B, C and D respectively. If these coils are sequentially energized in the order ABCD, the motor will rotate in one direction, and if they are energized in the order ADCB, the motor will rotate in the opposite direction. For controlling the direction of rotation of such motors, each motor 36 and 38, as illustrated, has associated therewith a device 36a or 38a which is responsive to the sign signal appearing on the associated line 26a or 28a to control the distribution of the pulses to the coils of the associated motors. For example, if the sign signal on the line 26a is such as to represent a plus sign, the device 36a may be operable to cause the pulses appearing on the line 32 to be distributed to the four coils of the motor 36 in the sequence ABCD, whereas if the sign signal is such as to represent a minus sign, the same device 36a operates to distribute the pulses to the coils of the motor in the sequence ADCB. As indicated in the drawings, the devices 36a and 38a may also include or be combined with power amplifiers for amplifying the pulses emitted from the divide-by-two devices to a power level sufficient for driving the stepping motors.

The form of the invention shown in FIG. 2 is identical with that shown in FIG. 1 except for employing a larger number of stepping motors. Referring to FIG. 2, the system therein shown includes three stepping motors 35, 37 and 39 associated with each of the X and Y axes. In this case, each divide-by-two device 30 of FIG. 1 is replaced by a ring counter 44 which operates to divide the primary trains of pulses into three secondary trains applied to the lines 45, 46 and 47 associated with the stepping motors 35, 37 and 39. That is, for each series of three pulses appearing on the line 26, taking the X axis by way of example, the first pulse is assigned by the ring counter 44 to the first stepping motor 35 through the line 45, the second pulse is assigned to the second stepping motor 37 through the line 46, and the third pulse is assigned to the third stepping motor 39 through the line 47. Also associated with each stepping motor is a pulse distributing and amplifying device 35a, 37a, or 39a, similar to the devices 36a and 38a of FIG. 1, for amplifying the pulses appearing on the associated line 45, 46 or 47 and for distributing the pulses to the coils of the stepping motor in such a sequence as to cause the motor to rotate in one direction or the other in accordance with the sign signal appearing on the associated sign signal line 26a or 28a. Also associated with each axis is a differential mechanism 48 having three inputs connected with the outputs 40, 40 of the stepping motors, the differential operating to combine the three inputs into a single output for the associated lead screw 10 or 12, the sum of the three input rotations appearing at the output shaft 10 or 12.

The invention claimed is:

1. A stepping motor drive for moving a part in response to a single primary train of electrical pulses, said drive comprising a plurality of stepping motors each having a rotatable output member and being of the pulse responsive type wherein said output member is moved by a given angular displacement in response to each pulse applied thereto, a summing differential drive mechanism having a plurality of rotatable input members each drivingly connected with a respective one of the output members of said stepping motors and also having a rotatable output member drivingly connected with said part, means coupled with the source of said single primary train of pulses which means is operable to transform said single primary train of pulses into a plurality of secondary trains of pulses each of which secondary trains contains a number of pulses proportionally related to the number of pulses in said primary train, and means for transmitting each of said secondary trains of pulses to a respective one of said stepping motors with the result that the output member of each stepping motor is driven at a slower speed than would be obtained by directly applying said primary train of pulses thereto.

2. A stepping motor drive for moving a part in response to a single primary train of electrical pulses, said drive comprising a plurality of stepping motors each having a rotatable output member and being of the pulse responsive type wherein said output member is moved by a given angular displacement in response to each pulse applied thereto, a summing differential drive mechanism having a plurality of rotatable input members each drivingly connected with a respective one of the output members of said stepping motors and also having a rotatable output member drivingly connected with said part, means coupled with the source of said single primary train of pulses which means is operable to transform said single primary train of pulses into a plurality of secondary trains of pulses each of which secondary trains contains a number of pulses proportionally related to and less than the number of pulses in said primary train, and means for transmitting each of said secondary trains of pulses to a respective one of said stepping motors with the result that the output member of each stepping motor is driven at a slower speed than would be obtained by directly applying said primary train of pulses thereto.

3. A stepping motor drive for moving a part in response to a primary train of electrical pulses, said drive comprising a plurality of stepping motors each having a rotatable output member and being of the pulse responsive type wherein said output member is moved by a given angular displacement in response to each pulse applied thereto, a differential drive mechanism having a plurality of rotatable input members each drivingly connected with a respective one of the output members of said stepping motors and also having a rotatable output member drivingly connected with said part, means coupled with the source of said primary train of pulses and with said stepping motors and which means is operable to divide said primary train of pulses into a plurality of secondary trains of pulses each of which secondary trains contains a number of pulses equal to the number of pulses in said primary train divided by the number of stepping motors, and means for transmitting each of said secondary trains of pulses to a respective one of said stepping motors with the result that the output member of each stepping motor is driven at a speed equal to dividing by the number of stepping motors the speed that would be obtained by directly applying said primary train of pulses thereto.

4. A stepping motor drive as defined in claim 3 further characterized by there being two stepping motors and said means for dividing said primary train of pulses into secondary trains of pulses comprising a divide-by-two device.

5. A stepping motor drive as defined in claim 3 further characterized by there being more than two stepping motors and said means for dividing said primary train of pulses into secondary trains of pulses comprising a ring counter.

6. A stepping motor drive for moving a part in response to a primary train of electrical pulses, said drive comprising a plurality of pulse responsive stepping motors each having a rotatable output member which is moved by a given angular displacement in response to each pulse applied thereto, a differential drive mechanism having a plurality of rotatable input members each drivingly connected with a respective one of the output members of said stepping motors and also having a rotatable output member drivingly connected with said part, and means coupled with the source of said train of pulses and with said stepping motors and which means is operable to sequentially distribute pulses to said stepping motors with one pulse being transmitted to one of said stepping motors for each pulse appearing in said train.

7. In a device wherein a part is movable in two coordinate directions relative to a reference part the combination comprising means for generating two single primary trains of pulses wherein the pulse rates are such that the pulse rate of one train divided by the pulse rate of the other train is equal in the coordinate system defined by said two coordinate directions to the slope of the line drawn between the present position of said part and a desired end position of said part, means for driving said part a given distance in one of said coordinate directions in response to each pulse in one of said single primary pulse trains, and means for driving said part a given distance in the other of said coordinate directions in response to each pulse in the other of said single primary pulse trains, each of said latter two means comprising a plurality of pulse responsive stepping motors each having a rotatable output member which is moved by a given angular displacement in response to each pulse applied thereto, a summing differential drive mechanism having a plurality of rotatable input members each drivingly connected with a respective one of the output members of said stepping motors and having an output member drivingly connected with said part, and means coupled with the associated single train of primary pulse and with said stepping motors and operable to sequentially distribute pulses to said stepping motors with one pulse being transmitted to one of said stepping motors for each pulse in the associated single primary train with the result that the output member of each stepping motor is driven at a slower speed than would be obtained by directly applying the associated single primary train of pulses thereto.

8. In a device wherein a part is movable in two coordinate directions relative to a reference part so as to be capable of following a path representing a given mathematical function the combination comprising means for generating two single primary trains of pulses and for controlling the pulse rates of said trains in accordance with the function represented by the path to be followed and with the result that the ratio of said pulse rates is varied as said movable part progresses along said path when said path is curved, means for driving said part a given distance in one of said coordinate directions in response to each pulse in one of said single primary pulse trains, and means for driving said part a given distance in the other of said coordinate directions in response to each pulse in the other of said single primary pulse trains, each of said latter two pulse responsive means comprising a plurality of stepping motors each having a rotatable output member which is moved by a given angular displacement in response to each pulse applied thereto, a summing differential drive mechanism having a plurality of rotatable input members each drivingly connected with a respective one of the output members of said stepping motors and having an output member drivingly connected with said part, and means coupled with the associated single train of primary pulses and with said stepping motors and operable to sequentially distribute pulses to said stepping motors with one pulse being transmitted to one of said stepping motors for each pulse in the associated single primary train with the result that the output member of each stepping motor is driven at a slower speed than would be obtained by directly applying the associated single primary train of pulses thereto.

9. A stepping motor drive for moving one part relative to another part, said drive comprising means for generating a single primary train of electrical pulses wherein the number of pulses in said train is proportionally related to the desired displacement of said one part relative to said other part, a plurality of pulse responsive stepping motors each having a movable output member which is moved by a given displacement in response to each pulse applied thereto, a mechanical summing device having a plurality of movable input members and one movable output member the displacement of which is a function of the sum of the displacements of said input members, means responsive to said single primary train of pulses for producing a plurality of secondary trains of pulses each of which secondary trains contains a number of pulses proportionally related to the number of pulses in said primary train, and means for transmitting each of said secondary trains of pulses to a respective one of said stepping motors with the result that the output member of each stepping motor is driven at a slower speed than would be obtained by directly applying said primary train of pulses thereto.

10. A stepping motor drive for moving one part relative to another part, said drive comprising means for generating a primary train of electrical pulses wherein the number of pulses in said train is proportionally related to the desired displacement of said one part relative to said other part and for also generating a direction signal representing the desired direction of movement of said part, a plurality of pulse responsive stepping motors each having a movable output member which is moved by a given displacement in response to each pulse applied thereto, a mechanical summing device having a plurality of movable input members and one movable output member the displacement of which is a function of the sum of the displacements of said input members, means responsive to said primary train of pulses for producing a plurality of secondary trains of pulses each of which secondary trains contains a number of pulses proportionally related to the number of pulses in said primary train, means for transmitting each of said secondary trains of pulses to a respective one of said stepping motors, a direction control device associated with each of said stepping motors for controlling the direction of movement of its output member in response to an applied direction signal, and means for transmitting said direction signal from said generating means to each of said direction control devices.

11. A stepping motor drive as defined in claim 1 further characterized by direction control means associated with each of said motors for controlling the direction of movement of said stepping motor output members, and means for applying a single direction command signal simultaneously and in common to said direction control means, said control means being effective to control the direction of movement of said stepping motor output members in such a manner that as a result of the same direction command signal being applied simultaneously to all of said control means said stepping motor output members are rotated in such directions as to have an additive effect relative to one another on the movement of said output member of said differential mechanism.

References Cited in the file of this patent

UNITED STATES PATENTS

| | | |
|---|---|---|
| 2,116,593 | Bouvier et al. | May 10, 1938 |
| 2,345,116 | Hanna | Mar. 28, 1944 |
| 2,423,440 | Neergaard | July 8, 1947 |
| 2,523,503 | Fairbanks | Sept. 26, 1950 |
| 2,537,427 | Seid et al. | Jan. 9, 1951 |
| 2,631,264 | Thomas | Mar. 10, 1953 |
| 2,676,289 | Wulfsberg et al. | Apr. 20, 1954 |
| 2,774,922 | Thomas | Dec. 18, 1956 |
| 2,823,324 | Davis | Feb. 11, 1958 |
| 2,898,531 | Gray | Aug. 4, 1959 |
| 2,910,638 | Linn | Oct. 27, 1959 |
| 2,941,136 | Marantette et al. | June 14, 1960 |
| 2,950,427 | Tripp | Aug. 23, 1960 |
| 3,002,115 | Johnson et al. | Sept. 26, 1961 |
| 3,099,777 | Davis | July 30, 1963 |

FOREIGN PATENTS

| | | |
|---|---|---|
| 816,370 | Great Britain | July 8, 1959 |